(12) United States Patent
Degtiarev et al.

(10) Patent No.: US 12,205,254 B1
(45) Date of Patent: Jan. 21, 2025

(54) AI-DRIVEN VIDEO STYLIZATION WITH TEXT DESCRIPTION TUNING

(71) Applicant: Glam Labs, Inc., San Francisco, CA (US)

(72) Inventors: Roman Degtiarev, Tbilisi (GE); Tikhon Vorobev, Saint Petersburg (RU); Vadim Titov, Moscow (RU)

(73) Assignee: Glam Labs, Inc., San Francisco, CA (US)

( * ) Notice: Subject to any disclaimer, the term of this patent is extended or adjusted under 35 U.S.C. 154(b) by 0 days.

(21) Appl. No.: 18/769,544

(22) Filed: Jul. 11, 2024

Related U.S. Application Data (63) Continuation-in-part of application No. 18/748,397, filed on Jun. 20, 2024.

(51) Int. Cl.
  *G06T 5/60* (2024.01)
  *G06T 3/18* (2024.01)
  *G06T 5/70* (2024.01)
  *G06V 40/10* (2022.01)

(52) U.S. Cl.
  CPC ............. *G06T 5/60* (2024.01); *G06T 3/18* (2024.01); *G06T 5/70* (2024.01); *G06V 40/10* (2022.01); *G06T 2207/10016* (2013.01); *G06T 2207/20084* (2013.01); *G06T 2207/30201* (2013.01)

(58) Field of Classification Search
  CPC .... G06T 5/60; G06T 3/18; G06T 5/70; G06T 2207/10016; G06T 2207/20084; G06T 2207/30201; G06V 40/10
  See application file for complete search history.

(56) References Cited

U.S. PATENT DOCUMENTS

| | | |
|---|---|---|
| 11,922,550 B1 * | 3/2024 | Ramesh ................ G06F 40/284 |
| 2024/0087179 A1 * | 3/2024 | Min ........................ G06T 11/00 |
| 2024/0135611 A1 * | 4/2024 | Costin ..................... G06T 11/60 |

* cited by examiner

*Primary Examiner* — Phuoc Tran
(74) *Attorney, Agent, or Firm* — Georgiy L. Khayet (57) ABSTRACT

Methods and systems for AI-driven video stylization are provided. An example method includes acquiring an input frame of an input video and a text including a prompt for transforming the input video to obtain an output video, warping the input frame to generate a warped frame, encoding the warped frame into an image latent and the text into a text embedding, generating a first noise for a portion of the image latent, adding the first noise to the image latent to obtain a noisy image latent, providing the noisy image latent and the text embedding to a neural network to generate a second noise for the portion of the image latent, where the neural network is trained to denoise the noisy image latent, modifying the noisy image latent based on the second noise, and decoding the noisy image latent into an output frame of the output video.

18 Claims, 8 Drawing Sheets

AI-DRIVEN VIDEO STYLIZATION WITH TEXT DESCRIPTION TUNING

CROSS-REFERENCE TO RELATED APPLICATIONS

This application is a Continuation-in-Part of and claims the priority benefit of U.S. patent application Ser. No. 18/748,397, entitled "AI-DRIVEN PHOTO STYLIZATION WITH TEXT DESCRIPTION TUNING" and filed on Jun. 20, 2024. The subject matter of the aforementioned application is incorporated herein by reference in its entirety for all purposes.

TECHNICAL FIELD

This disclosure generally relates to image processing. More particularly, this disclosure relates to systems and methods for Artificial-Intelligence (AI) driven video stylization with text description tuning.

BACKGROUND

Artificial Intelligence-based video generation and transformation is used in many applications, such as video chats, social networks, online media, and others. One of the main problems encountered during video generation transformations is the loss of quality and presence of unwanted artifacts in videos and images.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a method for AI-driven video stylization with text description tuning is provided. An example method includes acquiring an input frame of an input video and acquiring a text. The text includes at least one prompt for transforming the input video to obtain an output video. The method includes warping, based on a difference between the input frame and a preceding input frame of the input video, the input frame to generate a warped frame. The method includes encoding the warped frame into an image latent and encoding the text into a text embedding, randomly generating, based on the warped frame, a first noise for a portion of the image latent, and adding the first noise to the image latent to obtain a noisy image latent. The method includes providing the noisy image latent and the text embedding to a first neural network to generate a second noise for the portion of the image latent. The first neural network is trained to denoise the noisy image latent towards a true data distribution for latents corresponding to images. The method may include modifying the noisy image latent based on the second noise. The process of generating the second noise and modifying the noisy image latents are repeated a predetermined number of times until the noisy image latent converges to a further image latent belonging to the true data distribution for latents corresponding to images. The method includes decoding, using a second neural network, the noisy image latent into an output frame of the output video.

The first noise includes a Gaussian noise. The method includes extracting, from the input frame, using a third neural network, at least one feature of a person present in the input frame and adding the feature to the text prior to the encoding of the text into the text embedding.

The warping of input frame is based on a further difference between the preceding input frame of the input video and a preceding output frame of the output video. The preceding output frame corresponds to the preceding input frame. The image latent is generated by a Variational Autoencoders Encoder. The portion of the image latent corresponds to a part of the input frame, the part being obtained by applying a mask to the input frame. The method includes, while denoising the noisy image latent, determining that the second noise exceeds a predetermined threshold and based on the determination, blending the noisy image latent with the portion of the image latent to preserve a shape of the part of the input frame. The part of the input frame corresponds to at least one feature of a face present in the input frame. The mask is at least partially determined based on the difference between the input frame and the preceding input frame.

According to another embodiment, a system for AI-driven video stylization with text description tuning is provided. The system may include at least one processor and a memory storing processor-executable codes, where the processor can be configured to implement the operations of the above-mentioned method for video stylization.

According to yet another aspect of the disclosure, there is provided a non-transitory processor-readable medium, which stores processor-readable instructions. When the processor-readable instructions are executed by a processor, they cause the processor to implement the above-mentioned method for AI-driven video stylization with text description tuning.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The terms "can" and "may" shall mean "possibly be, but not limited to be."

This disclosure describes methods and systems for AI-driven video stylization with text description tuning. Specifically, certain embodiments enable the stylization of videos by frame by frame. In some embodiments, a system receives a frame of an input video and a text prompt. The text prompt contains instructions for stylizing a particular portion of the input video, which is identified by applying a mask. The system then uses a classifier to extract at least one feature from a frame and add it to the text prompt. This feature is associated with specific characteristics of an object, person, or animal present in the image. The system uses a latent diffusion algorithm to apply stylization only to the masked portion of the frame, leaving the rest unchanged. Before applying the diffusion algorithm, the text is encoded into a text embedding (e.g., using Contrastive Language-Image Pre-Training (CLIP)), and the selected portion of the image is encoded into an image latent (e.g., using Variational Autoencoders Encoder (VAE). Random Gaussian noise (first noise) is added to the image latent to obtain a noisy image latent. This noisy image latent is then combined with the text embedding to form a composite embedding, which is inputted into a U-net neural network. The U-net neural network predicts a second noise, which is subtracted from the first noise to refine the image latent. This process is iterated multiple times for further refinement of image latent. Finally, the refined image latent is decoded (e.g., using a VAE decoder) to produce an output frame of an output video. The output video is the input video stylized according to the text prompt.

Existing solutions using latent diffusion algorithms typically stylize entire frames of videos. According to some embodiments described in this disclosure, portions of frames of videos can be selectively stylized by applying different styles to specific masked regions. According to one example embodiment, segmentation masks can be used in static images to identify and isolate objects, while optical flow masks can be employed to track motions between frames and identify dynamic regions requiring special treatment. This approach allows applying varying degrees of modification to distinct areas, thereby ensuring that some regions are altered more or less than other regions.

Additionally, existing solutions often generate stylized videos with some artifacts. These artifacts may include changes associated with the person's ethnicity, age, or gender, as well as misplacement of facial features. The existing solutions may also cause incorrect spatial orientation, like person facing away from the camera instead of toward the camera or vice versa. Embodiments of the present disclosure mitigate these drawbacks by allowing adaptive video styling that considers the presence and position of objects in the frames. The system may modify the text instructions before encoding them into text embeddings by Contrastive Language-Image Pretraining (CLIP) neural network. CLIP is an AI model designed to understand images and text jointly. CLIP can recognize and describe visual content based on textual queries and vice versa. Prior to being provided to the CLIP, the text instructions can be passed through a text tokenizer. The modifications of the text instructions ensure that the ethnicity, gender, age, and pose (e.g., facing the camera or not) are accurately taken into account. To obtain this information from the frame, detectors and classifiers can be used to determine a person's ethnicity, gender, and age. The detectors and classifiers may include one or more neural networks trained to analyze the frame in order to determine the person's ethnicity, gender, and age. A pose estimator, such as, for example, DensePose, can be employed to predict the person's position in the frame, which helps to maintain spatial accuracy in the final stylized video.

Figure 1:
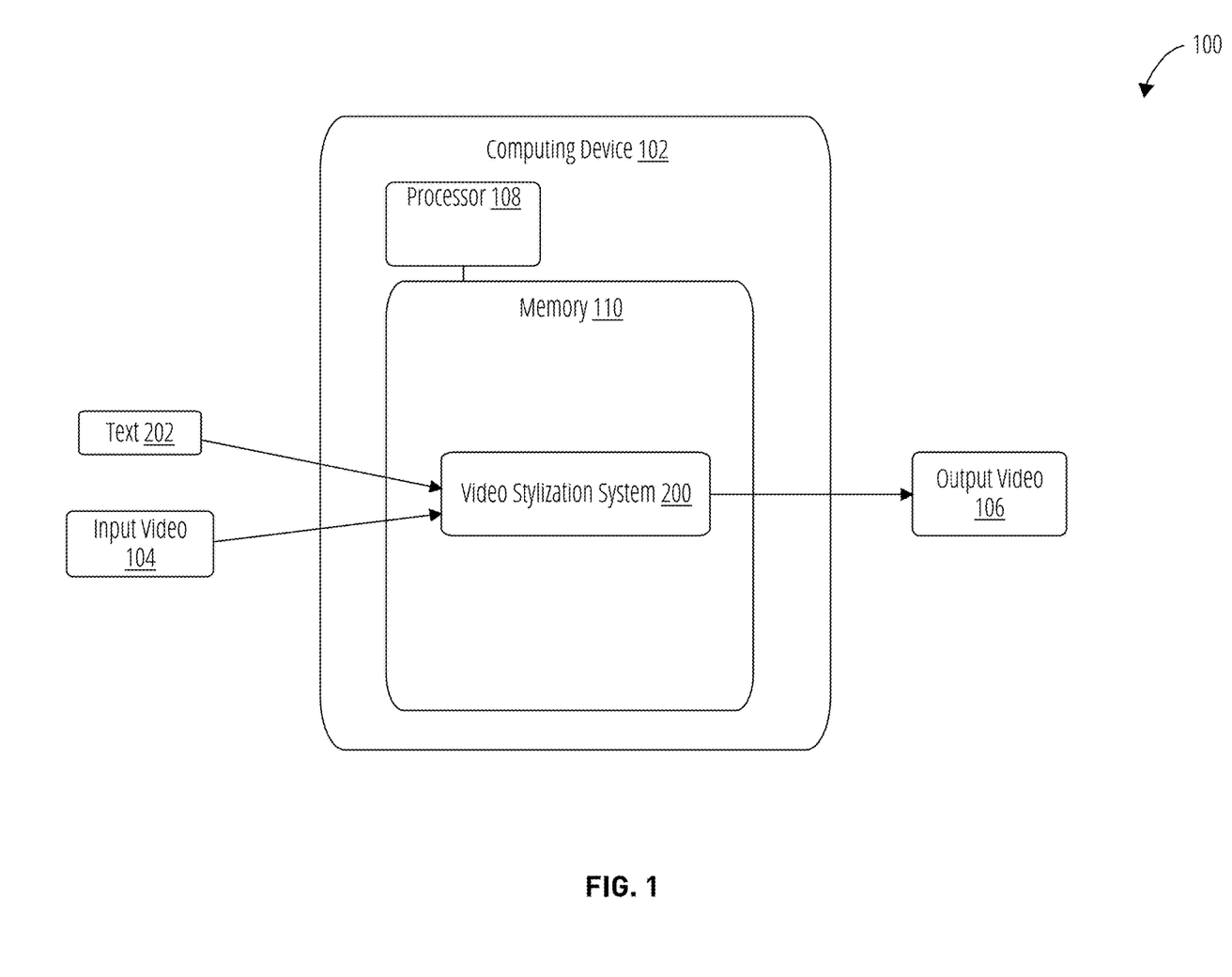
FIG. 1 shows an example environment in which systems and methods for AI-driven video stylization with text description tuning can be implemented, according to some example embodiments of the present disclosure.

Referring now to the drawings, FIG. 1 shows an example environment 100, in which systems and methods for AI-driven video stylization with text description tuning can be implemented. Environment 100 may include a computing device 102 including a processor 108 and a memory 110. Memory 110 may store, as processor-executable instructions, a system for AI-driven video stylization with text description tuning (also referred to as a video stylization system 200).

Computing device 102 may include, but is not limited to, a notebook computer or desktop computer including a graphic processing unit. In some embodiments, computing device 102 can be a part of cloud-based computing resource(s) shared by multiple users. The cloud-based computing resource(s) can include hardware and software available at a remote location and accessible over a data network. The cloud-based computing resource(s) can be dynamically re-allocated based on demand. The cloud-based computing resource(s) may include one or more server farms/clusters including a collection of computer servers that can be co-located with network switches and/or routers.

Video stylization system 200 can receive an input video 104 and a text 202. The text 202 may include a prompt on how to stylize input video 104. Video stylization system 200 may generate an output video 106 based on input video 104 and text 202. In various embodiments, the prompts in text 202 may include, for example, "generate image in anime style", "add snow to the background", "do not modify the background", and so forth. Input video 104 and text 202 can be provided by a user of computing device 102 via a user interface. Details of video stylization system 200 are described in FIG. 2A-2B.

Figure 2A:
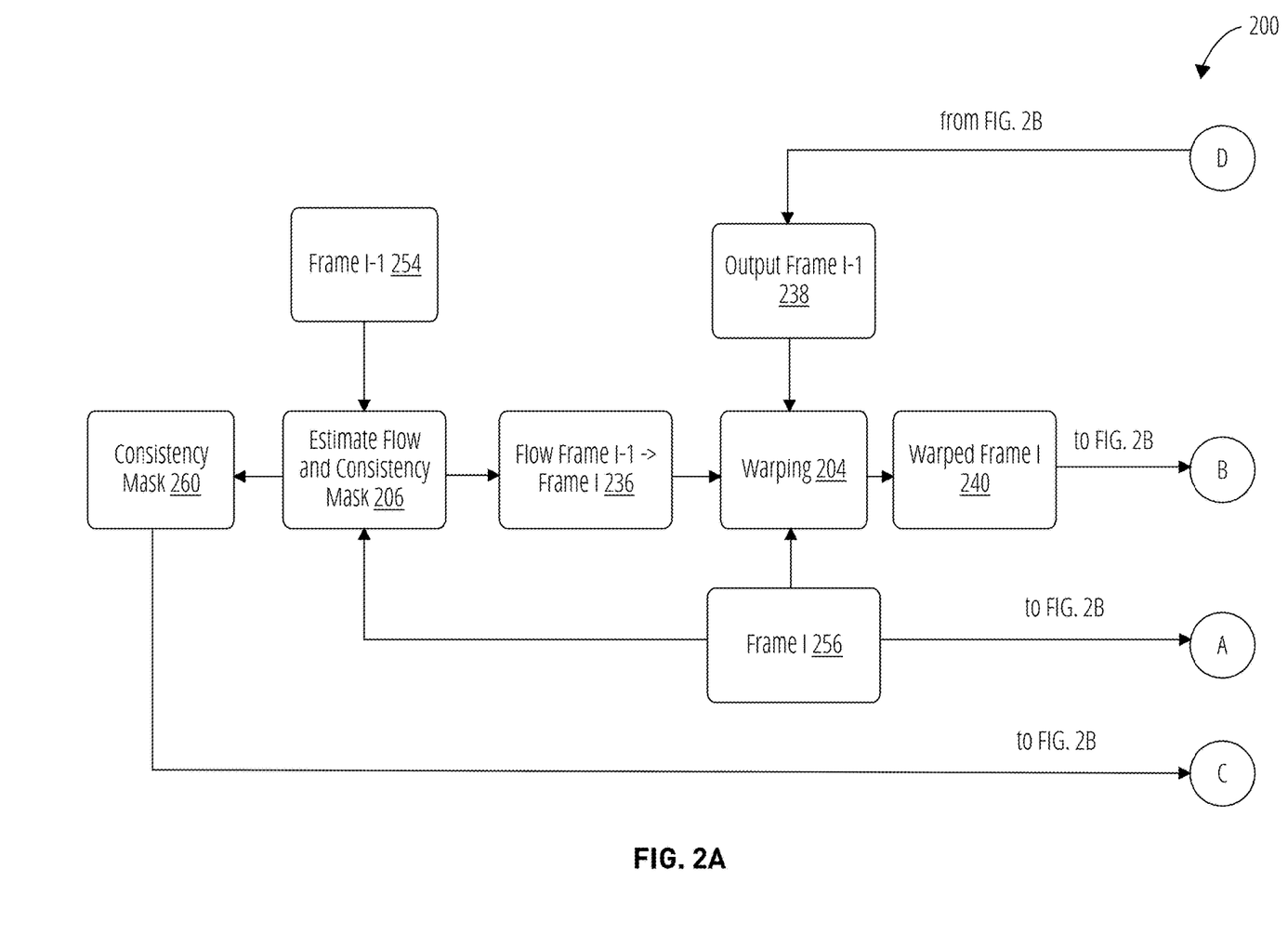
FIG. 2A and FIG. 2B is a block diagram showing modules of a system for AI-driven video stylization with text description tuning, according to an example embodiment of the present disclosure.
Figure 2B:
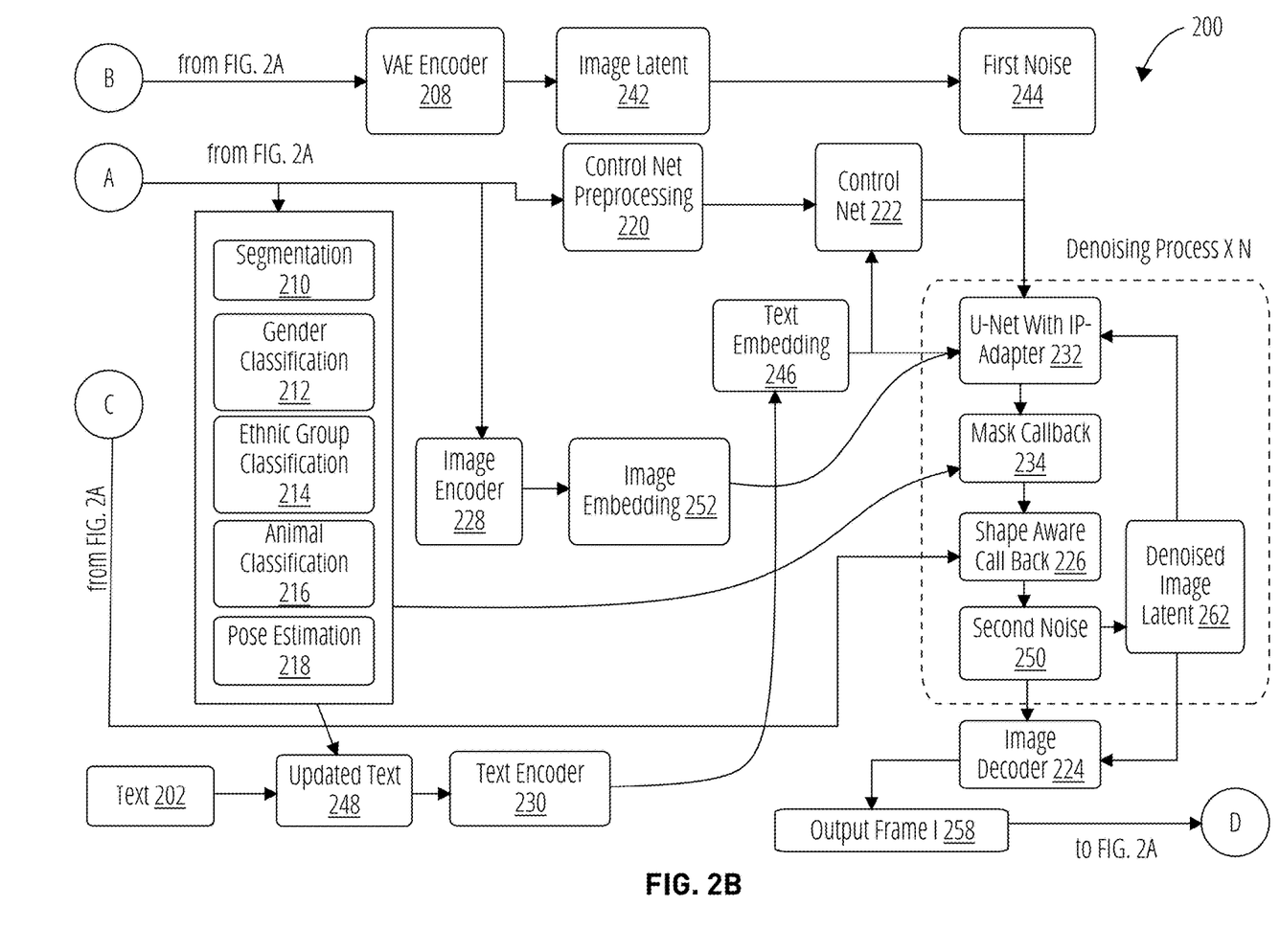

FIG. 2A and FIG. 2B is a block diagram showing modules of video stylization system 200 (the system for AI-driven video stylization with text description tuning), according to an example embodiment. The video stylization system 200 may include a warping 204, an estimate flow and consistency mask 206, a VAE encoder 208, a segmentation 210, a gender classification 212, an ethnic group classification 214, an animal classification 216, a pose estimation 218, a control net preprocessing 220, a control net 222, an image decoder 224, shape aware call back 226, an image encoder 228, a text encoder 230, a u-net with IP-Adapter 232, and a mask callback 234. Video stylization system 200 may process frames of input video 104 sequentially frame by frame to generate output frames of output video 106.

Estimate flow and consistency mask 206 may process frame i 256 and frame i−1 254 of input video 104 to generate a consistency mask 260. Frame i−1 254 precedes frame i 256 in input video 104. Estimate flow and consistency mask 206 may generate a forward flow shown as flow frame i−1→frame i 236 and a backward flow frame i→frame i−1. The forward flow is a forward vector indicating the direction and speed of movement of pixels and objects in frame i−1 254 to corresponding pixels and objects in frame i 256. The backward flow is a backward vector indicating the direction and speed of movement of the pixels and objects in frame i 256 to corresponding pixels and objects in frame i−1 254.

Estimate flow and consistency mask 206 may perform a consistency check based on the forward flow and the backward flow. The consistency check includes mapping each pixel in the frame i−1 254 to the next frame using the forward flow and then, using the backward flow, mapping the obtained pixels back to the original frame. Significant differences in the positions of re-mapped pixels from their original positions can indicates inconsistencies or unreliable motion areas, possibly due to occlusions, for example, when an object is hidden in frame i−1 254 but visible in frame i 256, or the object is hidden in frame i 256 but visible in frame i−1 254. The differences between the original positions and re-mapped positions can be measured and the pixels having the differences exceeding a predetermined threshold, can be marked as unreliable (or inconsistent) in consistency mask 260. The remaining pixels can be marked as reliable (or consistent). Thus, consistency mask 260 can show which parts of the frame i 256 have reliable motions and which parts do not. Consistency mask 260 may also indicate positions of the important features in frame i 256, such as, for example, eyes, nose, and mouth. Consistency mask 260 can be used to refine motion estimates, filter out noise, or handle occlusions. Consistency mask 260 can be provided to shape aware call back 226. The forward flow frame i−1→frame i 236 can be provided to warping 204.

Warping 204 can then process frame i 256, flow frame i−1→frame i 236, and output frame i−1 238 to generate warped frame i 240. Output frame i−1 238 is a frame of output video 106 that corresponds to frame i−1 254 of input video 104, that is output frame i−1 238 precedes output frame i 258 to be generated based on frame i 256 of input video 104. Warping 204 may generate, based on flow frame i−1→frame i 236 and output frame i−1 238, a flow map. The flow map includes indication where to move each pixel of the frame i 256 during warping, which is how to stretch, shrink, twist, or otherwise change the frame i 256. Warping 204 applies the flow map to the frame i 256 to obtain warped frame i 240. During warping, coordinates of pixels of frame i 256 are changed according to the flow map. When being moved, the pixels may not land exactly on the grid of the coordinates. Therefore, interpolation can be used to estimate the color of new pixel positions by blending the colors of nearby pixels.

In certain embodiments, warping can also be used to change facial expression of a face present in the frame i 256. For example, a flow map can be created that includes indications to move corners of the mouth of the face upwards. When the flow map is applied to frame i 256, the pixels at the corners of the mouth move up, thereby creating an appearance of a bigger smile in warped frame i 240 than in frame i 256. In further embodiments, warping can be used to create different special effects, reshape objects in frame i 256, correct frame i 256 distortions, stabilize shaky footage of input video 104, track objects in the frames of input video 104, and so on.

VAE encoder 208 may receive warped frame i 240 and encode warped frame i 240 into image latent 242 (also referred to as a latent vector). Image latent 242 may refer to a numerical representation of warped frame i 240 in a vector space associated with a diffusion model.

Image encoder 228 may receive frame i 256 and encode frame i 256 into an image embedding 252. The image embedding 252 may refer to a compressed, continuous, and typically lower-dimensional representation of frame i 256 in a latent space. In some embodiments, image encoder 228 can be a convolutional neural network (CNN), for example CLIP, or other types of networks designed to extract meaningful features from images.

Segmentation 210 may analyze frame i 256 to determine portions of frame i 256. The portions can be provided to mask callback 234 to generate masks for the portions. The masks may include a mask for the body of a person in frame i 256, a mask of background in frame i 256, a mask for hair region of the person in frame i 256, and so forth.

Gender classification 212 may analyze frame i 256 to determine a gender of a person present in frame i 256. Ethnic group classification 214 may analyze frame i 256 to determine an ethnic group of the person. Pose estimation 218 (such as DensePose) may predict a pose of the person in frame i 256, for example, whether the person is facing away or facing the camera. Video stylization system 200 may further include one or more models for detecting further features of the person present in frame i 256, such an age, a hairstyle, and so forth. Animal classification 216 may analyze frame i 256 to determine a type and/or a breed of an animal present in frame i 256. In various embodiments, segmentation 210, gender classification 212, ethnic group classification 214, animal classification 216, and pose estimation 218 can be implemented as pretrained neural networks.

The features determined by gender classification 212, ethnic group classification 214, animal classification 216, and pose estimation 218 can be added to text 202 to form an updated text 248. The example features added to the text 202, may include "an African young woman facing the camera", "a Caucasian man facing away from the camera", "a girl raising her right hand", and so forth. For example, if original text 202 includes "woman portrayed in an anime style" and ethnic group classification 214 determines that frame i 256 includes an African woman, then the text 202 can be modified to "an African woman in anime style". Updated text 248 can be provided to text encoder 230.

Text encoder 230 may transform the updated text 248 to a text embedding 246. The text embedding 246 may refer to a numerical representation of a text in a latent space. The latent space of text embedding 246 aligns with the latent space of image embedding 252 generated by the image encoder 228. The text encoder 230 can be CLIP, or other networks designed to transform the text into text embeddings.

Control net preprocessing 220 may analyze frame i 256 to determine an additional input for control net 222. The additional input may include sketches, outlines, edge maps, key points, and other features in the frame i 256. Control net 222 can generate, based on text embedding 246 and the additional input, a control vector in an internal format readable by U-net with IP-Adapter 232.

Video stylization system 200 can generate a first noise 244 of the same size as the image latent 242. This first noise 244 typically consists of randomly generated Gaussian noise for a specific portion of image latent 242 that corresponds to a section of frame i 256. The first noise 244 can be injected into the image latent 242 to obtain noisy image latent. The noisy image latent is processed by U-net with IP-Adapter 232.

U-net with IP-Adapter 232 may include a U-net and an Input Processing Adapter (IP Adapter). U-net may include cross-attention layers to integrate the text embedding 246, image embedding 252 and control vector generated by control net 222. U-net is trained to predict second noise 250. This second noise 250 represents the difference between the noisy image latent and the denoised approximation that aligns with the true data distribution of image latents. This true data distribution approximates the probability distribution of clean image latents derived from a set of sample images. IP Adapter (Input Processing Adapter) can be an additional module or component that modifies how the input data is processed before being fed to the U-net. Combining a U-Net with an IP Adapter allows incorporating additional inputs and control mechanisms to enhance the image processing capabilities of the U-Net. The IP-Adapter can process image embedding 252 to extract useful information or modify the image embedding 252 to ensure that the U-Net generates correct output.

Mask callback 234 can generate a mask determining how different parts of frame i 256 are processed. Specifically, mask callback 234 creates a mask that defines to what extent to process and change different parts of frame i 256 (for example, faces, facial features, foreground, and background). Accordingly, in some embodiments, video stylization system 200 can generate different first noise 244 (and correspondently, second noise 250) for various portions of frame i 256, allowing specific regions to be modified differently. This targeted approach ensures that some areas of frame i 256 are altered less or more than others, enabling the application of different styles to specific sections based, for example, on the prompts provided in text 202. The first noise 244 can be injected only into the part of image latent 242 that corresponds to a region of frame i 256 defined by the mask.

The video stylization system 200 may utilize second noise 250 to obtain a denoised image latent 262 by applying a linear transformation to the noisy image latent. The denoised image latent 262 can then be processed by U-net with IP-Adapter 232 to update second noise 250, which in turn can be used to update the denoised image latent 262. This iterative process of predicting second noise 250 and updating denoised image latent 262 can be repeated several times (e.g., five) until the denoised image latent 262 converges to an image latent belonging to the true data distribution of latents corresponding to images. Thus, the iterative process progressively aligns the denoised image latent 262 with the desired data distribution to achieve high-quality stylization.

During the iterative process, shape aware call back 226 ensures that certain shapes or structures in frame i 256 are preserved and consistent throughout noise reduction. Shape aware call back 226 utilizes consistency mask 260 that highlights positions of important features in frame i 256, for example like eyes, nose, and mouth, or other objects. Shape aware call back 226 also utilize different levels of noise to be applied at each iterative step and a predetermined threshold that determines when to stop using the shape constraints. Initially, as the noise is reduced, the shape aware call back 226 ensures that the eyes, nose, mouth, and other objects stay clear and recognizable. Once the threshold is reached, the process continues without the shape constraints, focusing on overall noise reduction.

Specifically, shape aware call back 226 converts consistency mask 260 to a tensor format compatible with process of refining denoised image latent 262. At each iteration step of refining denoised image latent 262 and calculating second noise 250, shape aware call back 226 checks if the current second noise 250 is within the threshold. If the current second noise 250 is above the threshold, shape aware call back 226 uses the consistency mask 260 to blend the second noise 250 with the current denoised image latent 262, ensuring important shapes are preserved. If the current second noise 250, shape aware call back 226 stops applying the shape constraints and allows regular processing without changing the second noise 250.

After the iterative denoising steps, the denoised image latent 262 is provided to image decoder 224. The image decoder 224, which may include a VAE decoder, processes the refined denoised image latent 262 to reconstruct an output frame i 258 that aligns with the stylistic instructions while preserving the key features of the original image.

Figure 3:
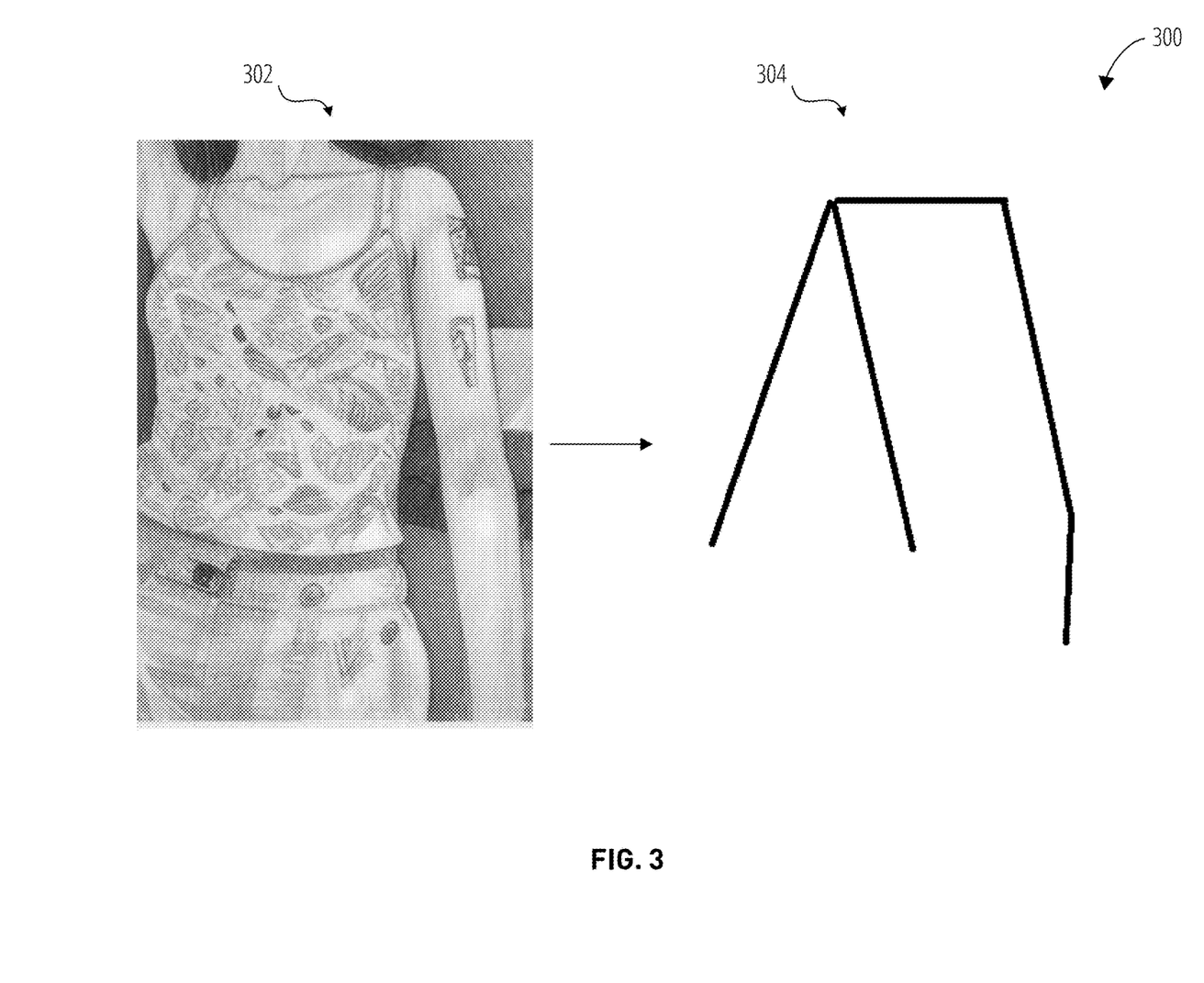
FIG. 3 is a schematic showing an example image of a person and an image of the skeleton associated to the person, according to an example embodiment of the present disclosure.

FIG. 3 is a schematic 300 showing an example image 302 and an image of skeleton 304 corresponding to a person present in image 302. Pose estimation 218 (shown in FIG. 2B) may include a neural network that generates skeleton 304 from image 302. Points in skeleton 304 can be assigned colors indicating a coordinate of the points in a horizontal direction from the point of view of the camera. In some embodiments, the skeleton 304 can be generated by a DensePose.

Pose estimation 218 may include a model that determines the pose of the person in image 302. For example, if the coordinate of the left shoulder is less than the coordinate of the right shoulder, then the person is facing forward. If the shoulders are not visible, the model may analyze the hips. If the coordinate of the left hip is smaller than the right hip, then the person is facing forward. On the contrary, if the coordinate of the right shoulder (or hip) is smaller than the left one, then the person is facing backwards.

In example of FIG. 3, the left shoulder is less than the coordinate of the right shoulder. It means that the person is facing forward. Accordingly, if original text 202 includes "woman in anime style", then the text 202 can be modified to "woman in anime style in front".

Figure 4:
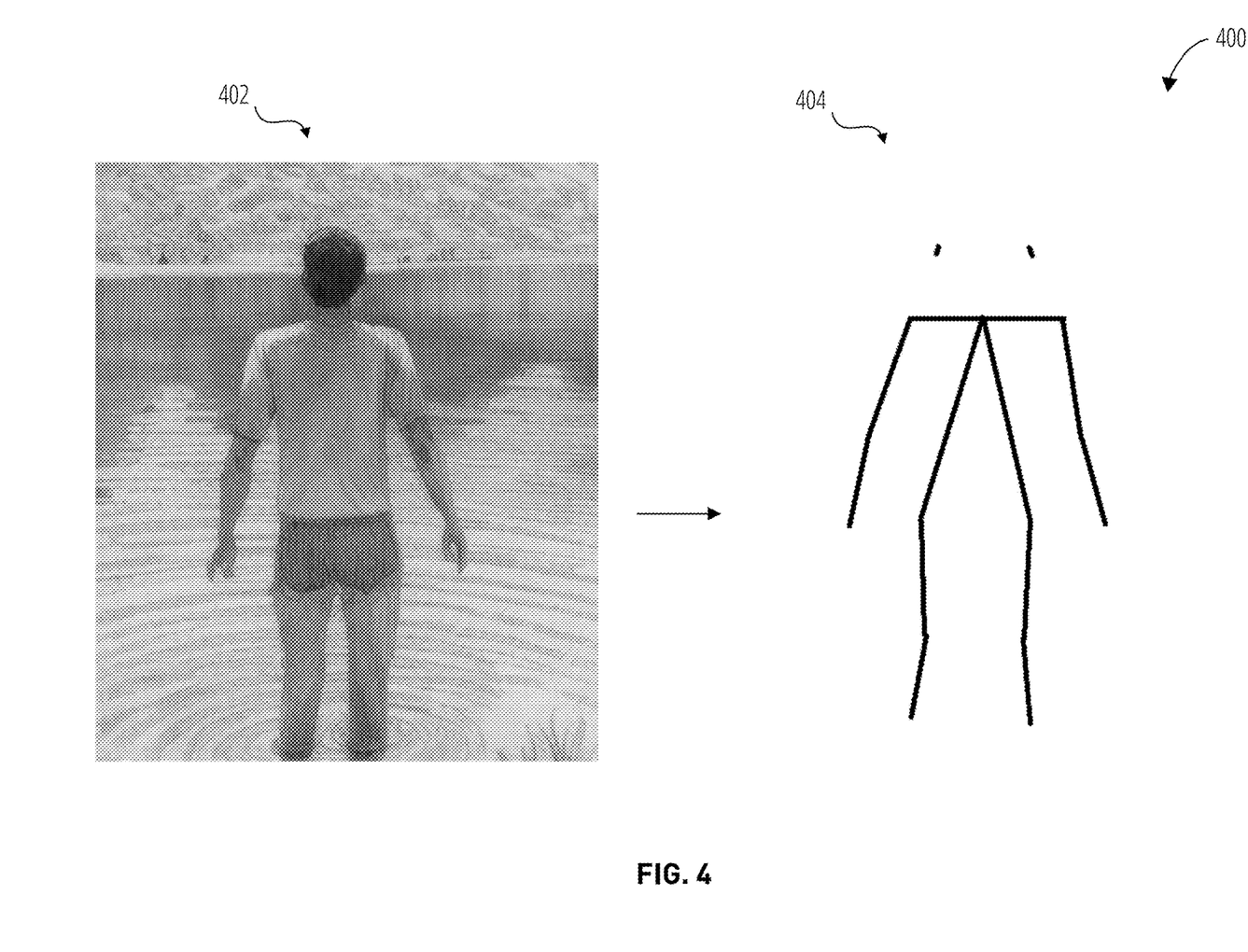
FIG. 4 is a schematic showing an example image of a person and an image of a skeleton associated with the person, according to an example embodiment of the present disclosure.

FIG. 4 is a schematic 400 showing an example image 402 and an image of a skeleton 404 corresponding to a person present in image 402. In image 402, a person is shown in full length. In corresponding skeleton 404, the left shoulder and the right shoulder have the same coordinate in the horizontal direction from the point of view of the camera. However, the coordinate of the right hip is smaller than the coordinate of the left hip. It means that the person is facing backwards. Accordingly, if original text 202 includes "a man in anime style", then the text 202 can be modified to "body of a man in anime style viewed from behind".

Figure 5:
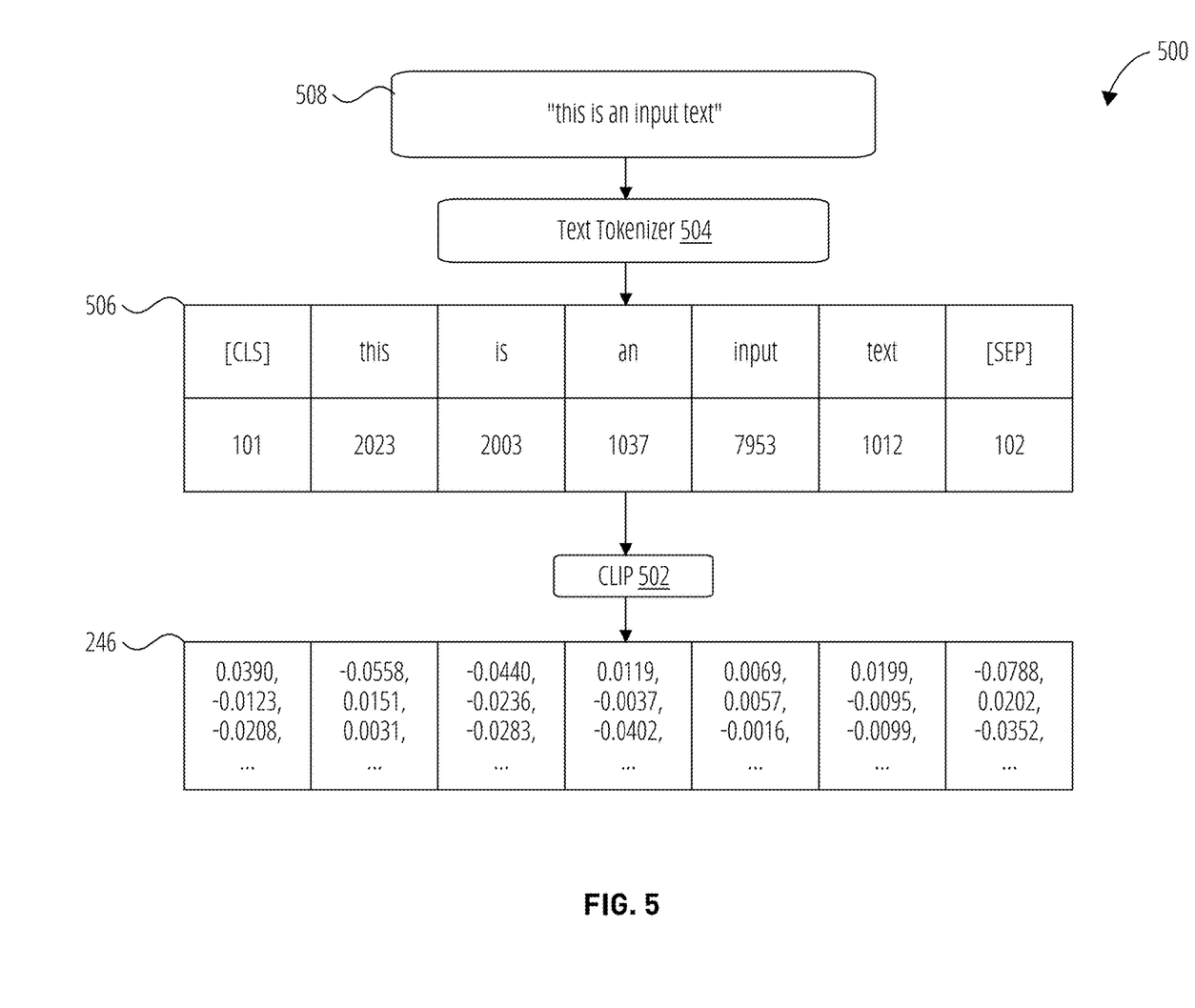
FIG. 5 is a block diagram showing a text encoder, according to an example embodiment of the present disclosure.

FIG. 5 is a block diagram 500 showing details of converting text into text embedding 246 (shown in FIG. 2A), according to an example embodiment. In the example of FIG. 5, CLIP 502 is used as text encoder 230 shown in FIG. 2B. Text tokenizer 504 may generate text tokens 506 from raw text 508, for example, text 202. Then text tokens 506 can be provided to CLIP 502 to generate text embedding.

Figure 6:
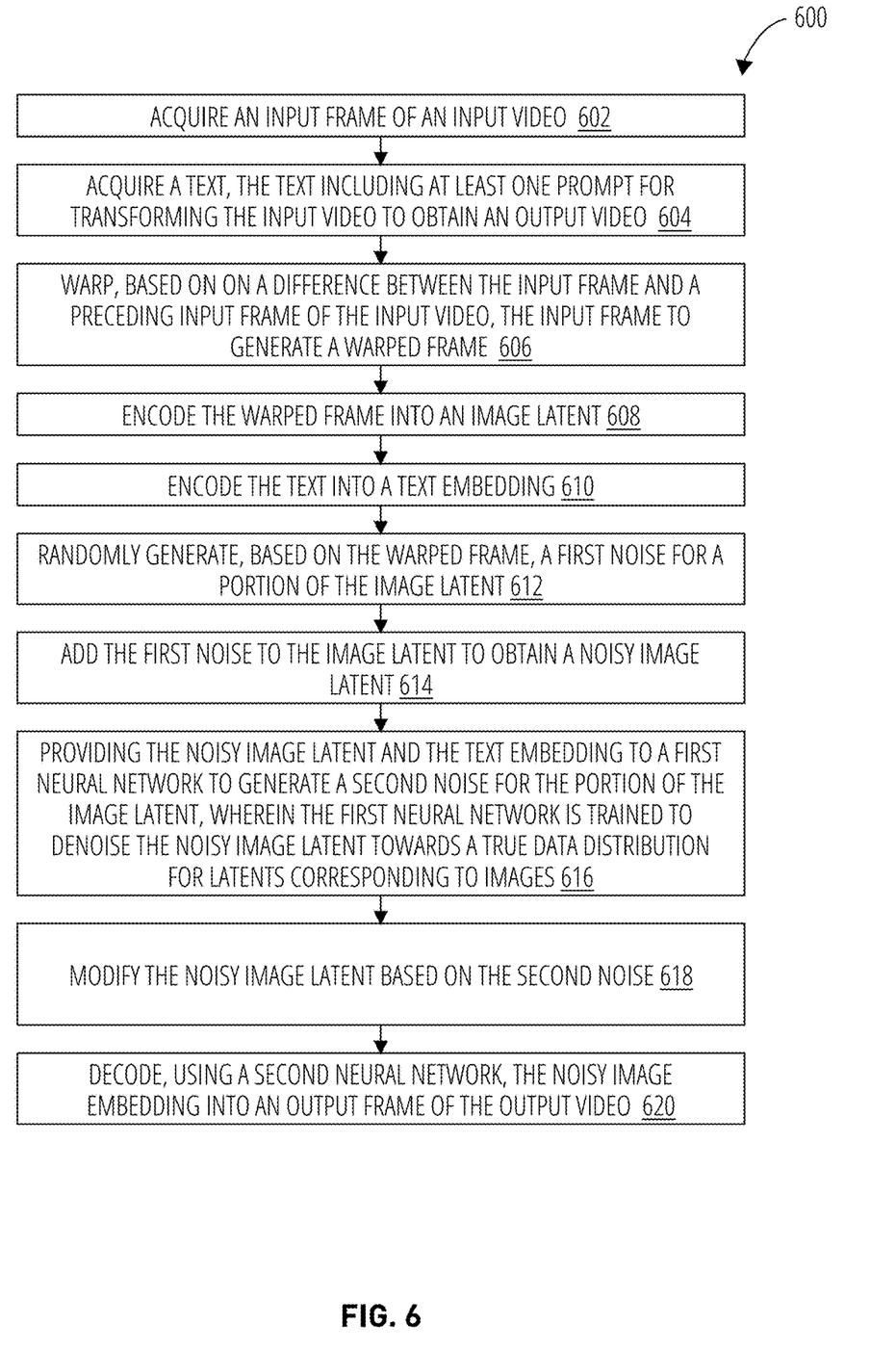
FIG. 6 illustrates a method for video stylization, in accordance with some embodiment of the present disclosure.

FIG. 6 is a flow chart showing method 600 for AI-driven video stylization with text description tuning, according to some example embodiments. Method 600 can be impended by computing device 102 and video stylization system 200 shown in FIG. 1 and FIG. 2A-2B. In some embodiments, the operations of method 600 may be combined, performed in parallel, or performed in a different order. Method 600 may also include additional or fewer operations than those illustrated. Method 600 may be performed by processing logic that comprises hardware (e.g., decision making logic, dedicated logic, programmable logic, and microcode), software (such as software run on a general-purpose computer system or a dedicated machine), or a combination of both.

In block 602, method 600 includes acquiring an input frame of an input video. In block 604, method 600 includes acquiring a text. The text includes at least one prompt for transforming the input video to obtain an output video at block 604.

In block 606, method 600 includes warping, based on a difference between the input frame and a preceding input frame of the input video, the input frame to generate a warped frame. The warping can be based on the difference between the preceding input frame of the input video and a preceding output frame of the output video. The preceding output frame corresponds to the preceding input frame.

In block 608, method 600 includes encoding the warped frame into an image latent. In block 602, method 600 includes encoding the text into a text embedding at block 610. In block 612, method 600 includes randomly generating, based on the warped frame, a first noise for a portion of the image latent. The image latent can be generated by a VAE encoder. The portion of the image latent corresponds to a part of the input frame. The part is obtained by applying a mask to the input frame. The mask can be at least partially determined based on the difference between the input frame and the preceding input frame. The part of the input frame may correspond to at least one feature of a face present in the input frame.

In block 614, method 600 includes adding the first noise to the image latent to obtain a noisy image latent. The first noise ma include a Gaussian noise.

In block 616, method 600 includes providing the noisy image latent and the text embedding to a first neural network to generate a second noise for the portion of the image latent. The first neural network is trained to denoise the noisy image latent towards a true data distribution for latents corresponding to images. Method 600 may include extracting, from the input frame, using a third neural network, at least one feature of a person present in the input frame and adding the feature to the text prior to the encoding of the text into the text embedding.

In block 618, method 600 includes modifying the noisy image latent by applying a linear transformation based on the second noise. Operations in blocks 616 and 618 are repeated a predetermined number of times until the noisy image latent converges to a further image latent belonging to the true data distribution for latents corresponding to images. Method 600 may include while denoising the noisy image latent, determining that the second noise exceeds a predetermined threshold and based on the determination, blending the noisy image latent with the portion of the image latent to preserve a shape of the part of the input frame.

In block 620, method 600 includes decoding, using a second neural network, the noisy image embedding into an output frame of the output video. The second neural network may include a VAE decoder.

Figure 7:
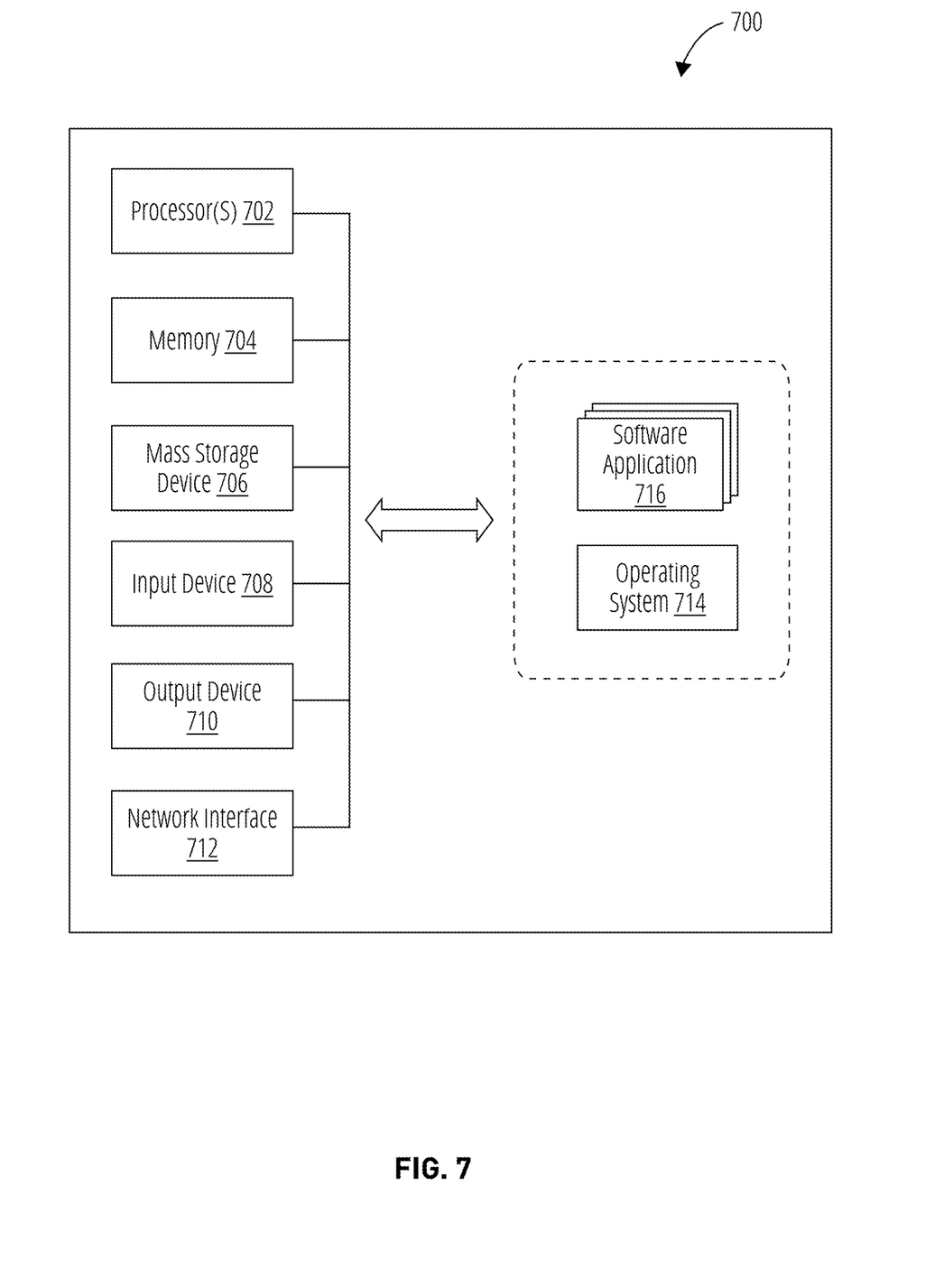
FIG. 7 is a high-level block diagram illustrating an example computer system, within which a set of instructions for causing the machine to perform any one or more of the methodologies discussed herein can be executed.

FIG. 7 is a high-level block diagram illustrating an example computer system 700, within which a set of instructions for causing the machine to perform any one or more of the methodologies discussed herein can be executed. The computer system 700 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 700 is an example of computing device 102 shown in FIG. 1. Notably, FIG. 7 illustrates just one example of the computer system 700 and, in some embodiments, the computer system 700 may have fewer elements/modules than shown in FIG. 7 or more elements/modules than shown in FIG. 7.

The computer system 700 may include one or more processor(s) 702, a memory 704, one or more mass storage devices 706, one or more input devices 708, one or more output devices 710, and a network interface 712. The processor(s) 702 are, in some examples, configured to implement functionality and/or process instructions for execution within the computer system 700. For example, the processor(s) 702 may process instructions stored in the memory 704 and/or instructions stored on the mass storage devices 706. Such instructions may include components of an operating system 714 or software applications 716. The computer system 700 may also include one or more additional components not shown in FIG. 7, such as a body, a power supply, a power supply, a global positioning system (GPS) receiver, and so forth.

The memory 704, according to one example, is configured to store information within the computer system 700 during operation. The memory 704, in some example embodiments, may refer to a non-transitory computer-readable storage medium or a computer-readable storage device. In some examples, the memory 704 is a temporary memory, meaning that a primary purpose of the memory 704 may not be long-term storage. The memory 704 may also refer to a volatile memory, meaning that the memory 704 does not maintain stored contents when the memory 704 is not receiving power. Examples of volatile memories include random access memories (RAM), dynamic random access memories (DRAM), static random access memories (SRAM), and other forms of volatile memories known in the art. In some examples, the memory 704 is used to store program instructions for execution by the processor(s) 702. The memory 704, in one example, is used by software (e.g., the operating system 714 or the software applications 716). Generally, the software applications 716 refer to software applications suitable for implementing at least some operations of the methods for AI-driven video stylization with text description tuning as described herein.

The mass storage devices 706 may include one or more transitory or non-transitory computer-readable storage media and/or computer-readable storage devices. In some embodiments, the mass storage devices 706 may be configured to store greater amounts of information than the memory 704. The mass storage devices 706 may further be configured for long-term storage of information. In some examples, the mass storage devices 706 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 708, in some examples, may be configured to receive input from a user through tactile, audio, video, or biometric channels. Examples of the input devices 708 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 700, or components thereof.

The output devices 710, in some examples, may be configured to provide output to a user through visual or auditory channels. The output devices 710 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. The output devices 710 may also include a touchscreen, a presence-sensitive display, or other input/output capable displays known in the art.

The network interface 712 of the computer system 700, in some example embodiments, can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, Wi-Fi® networks, among others. The network interface 712 may be a network interface card, such as an Ethernet card, an optical transceiver, a radio frequency transceiver, or any other type of device that can send and receive information.

The operating system 714 may control one or more functionalities of the computer system 700 and/or components thereof. For example, the operating system 714 may interact with the software applications 716 and may facilitate one or more interactions between the software applications 716 and components of the computer system 700. As shown in FIG. 7, the operating system 714 may interact with or be otherwise coupled to the software applications 716 and components thereof. In some embodiments, the software applications 716 may be included in the operating system 714. In these and other examples, virtual modules, firmware, or software may be part of the software applications 716.

Thus, systems and methods for AI-driven video stylization with text description tuning have been described. Although embodiments have been described with reference to specific example embodiments, it will be evident that various modifications and changes can be made to these example embodiments without departing from the broader spirit and scope of the present Application. Accordingly, the specification and drawings are to be regarded in an illustrative rather than a restrictive sense.

What is claimed is:

1. A method comprising:
acquiring an input frame of an input video;
acquiring a text, the text including at least one prompt for transforming the input video to obtain an output video;
warping, based on a difference between the input frame and a preceding input frame of the input video, the input frame to generate a warped frame;
encoding the warped frame into an image latent;
extracting, from the input frame, using a pretrained neural network, at least one feature of a person present in the input frame, the at least one feature including one or more of the following: an ethnicity of the person, a gender of the person, an age of the person, and an orientation of body of the person with respect to a plane of the input frame;
adding the at least one feature to the text to obtain an updated text;
encoding the updated text into a text embedding;
randomly generating, based on the warped frame, a first noise for a portion of the image latent;
adding the first noise to the image latent to obtain a noisy image latent;
(a) providing the noisy image latent and the text embedding to a first neural network to generate a second noise for the portion of the image latent, wherein the first neural network is trained to denoise the noisy image latent towards a true data distribution for latents corresponding to images;
(b) modifying the noisy image latent based on the second noise; and
decoding, using a second neural network, the noisy image latent into an output frame of the output video.

2. The method of claim 1, wherein operations (a) and (b) are repeated a predetermined number of times until the noisy image latent converges to a further image latent belonging to the true data distribution for latents corresponding to images.

3. The method of claim 1, wherein the warping is based on a further difference between the preceding input frame of the input video and a preceding output frame of the output video, the preceding output frame corresponding to the preceding input frame.

4. The method of claim 1, wherein the image latent is generated by a Variational Autoencoders Encoder.

5. The method of claim 1, wherein the portion of the image latent corresponds to a part of the input frame, the part being obtained by applying a mask to the input frame.

6. The method of claim 5, further comprising, while denoising the noisy image latent:
determining that the second noise exceeds a predetermined threshold; and
based on the determination, blending the noisy image latent with the portion of the image latent to preserve a shape of the part of the input frame.

7. The method of claim 5, wherein the part of the input frame corresponds to at least one feature of a face present in the input frame.

8. The method of claim 5, wherein the mask is at least partially determined based on the difference between the input frame and the preceding input frame.

9. The method of claim 1, wherein the first noise includes a Gaussian noise.

10. A computing device comprising:
a processor; and
a memory storing instructions that, when executed by the processor, configure the computing device to:
acquire an input frame of an input video;

acquire a text, the text including at least one prompt for transforming the input video to obtain an output video;

warp, based on a difference between the input frame and a preceding input frame of the input video, the input frame to generate a warped frame;

encode the warped frame into an image latent;

extract, from the input frame, using a pretrained neural network, at least one feature of a person present in the input frame, the at least one feature including one or more of the following: an ethnicity of the person, a gender of the person, an age of the person, and an orientation of body of the person with respect to a plane of the input frame;

add the at least one feature to the text to obtain an updated text;

encode the updated text into a text embedding;

randomly generate, based on the warped frame, a first noise for a portion of the image latent;

add the first noise to the image latent to obtain a noisy image latent;

(a) provide the noisy image latent and the text embedding to a first neural network to generate a second noise for the portion of the image latent, wherein the first neural network is trained to denoise the noisy image latent towards a true data distribution for latents corresponding to images;

(b) modify the noisy image latent based on the second noise; and decode, using a second neural network, the noisy image latent into an output frame of the output video.

11. The computing device of claim 10, wherein operations (a) and (b) are repeated a predetermined number of times until the noisy image latent converges to a further image latent belong to the true data distribution for latents corresponding to images.

12. The computing device of claim 10, wherein the warping is based on a further difference between the preceding input frame of the input video and a preceding output frame of the output video, the preceding output frame corresponding to the preceding input frame.

13. The computing device of claim 10, wherein the image latent is generated by a Variational Autoencoders Encoder.

14. The computing device of claim 10, wherein the portion of the image latent corresponds to a part of the input frame, the part being obtained by applying a mask to the input frame.

15. The computing device of claim 14, wherein the instructions further configure the computing device to, while denoising the noisy image latent:

determine that the second noise exceeds a predetermined threshold; and based on the determination, blend the noisy image latent with the portion of the image latent to preserve a shape of the part of the input frame.

16. The computing device of claim 14, wherein the part of the input frame corresponds to at least one feature of a face present in the input frame.

17. The computing device of claim 14, wherein the mask is at least partially determined based on the difference between the input frame and the preceding input frame.

18. A non-transitory computer-readable storage medium, the computer-readable storage medium including instructions that, when executed by a computing device, cause the computing device to:

acquire an input frame of an input video;

acquire a text, the text including at least one prompt for transforming the input video to obtain an output video;

warp, based on a difference between the input frame and a preceding input frame of the input video, the input frame to generate a warped frame;

encode the warped frame into an image latent;

extract, from the input frame, using a pretrained neural network, at least one feature of a person present in the input frame, the at least one feature including one or more of the following: an ethnicity of the person, a gender of the person, an age of the person, and an orientation of body of the person with respect to a plane of the input frame;

add the at least one feature to the text to obtain an updated text;

encode the updated text into a text embedding;

randomly generate, based on the warped frame, a first noise for a portion of the image latent;

add the first noise to the image latent to obtain a noisy image latent;

(a) provide the noisy image latent and the text embedding to a first neural network to generate a second noise for the portion of the image latent, wherein the first neural network is trained to denoise the noisy image latent towards a true data distribution for latents corresponding to images;

(b) modify the noisy image latent based on the second noise; and decode, using a second neural network, the noisy image latent into an output frame of the output video.

* * * * *